Figure 1:
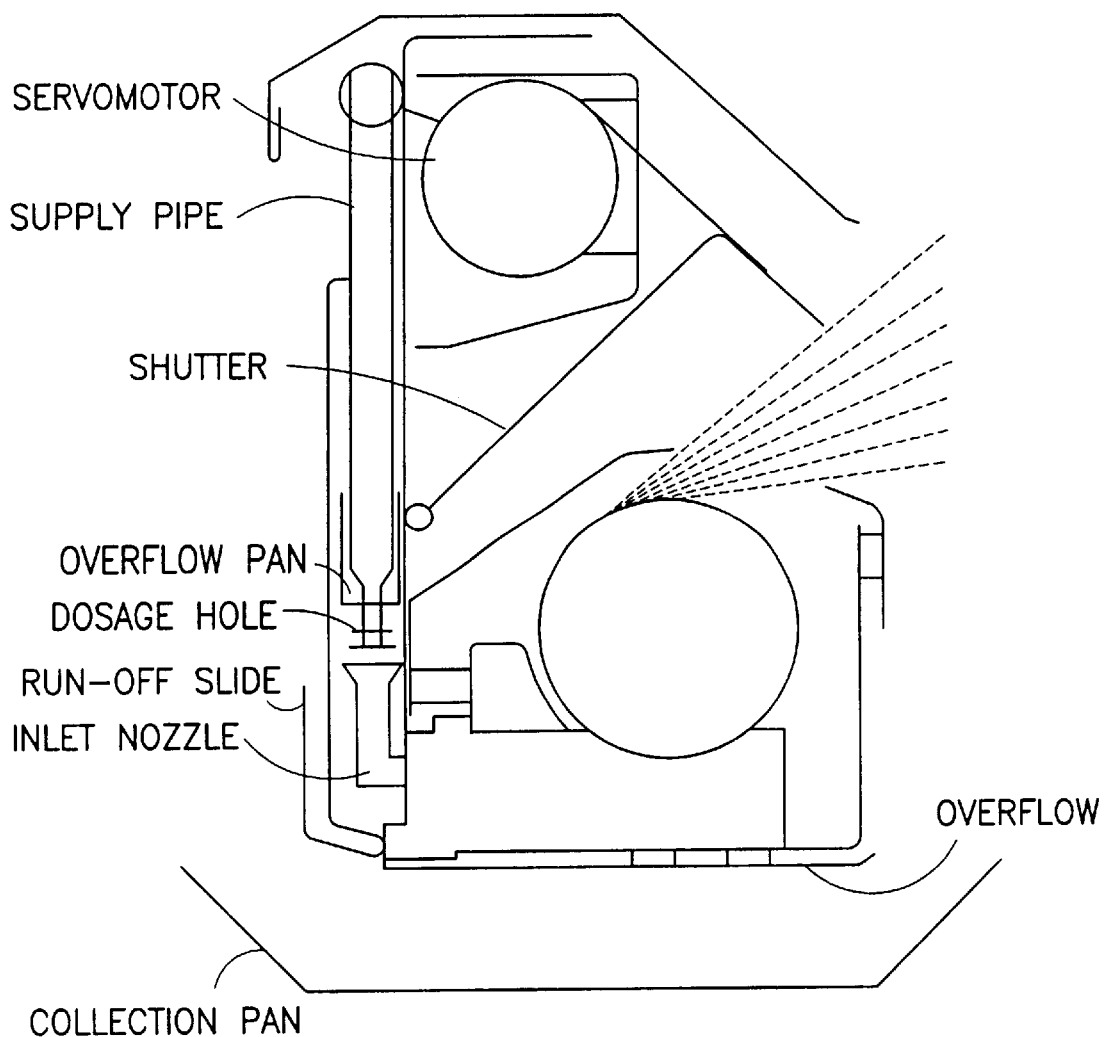

United States Patent [19]
Pagano

[11] Patent Number: 6,139,970
[45] Date of Patent: Oct. 31, 2000

[54] COMPOSITION FOR COATING GLASS SHEETS

[76] Inventor: Carmine Pagano, 106 Bradley Ave., White Plains, N.Y. 10607

[21] Appl. No.: 09/409,142

[22] Filed: Sep. 30, 1999

Related U.S. Application Data

[62] Division of application No. 08/977,968, Nov. 12, 1997, Pat. No. 5,962,565.

[51] Int. Cl.⁷ ...................................................... B32B 17/10
[52] U.S. Cl. ........................................... 428/441; 428/442
[58] Field of Search ...................................... 428/441, 442

[56] References Cited

U.S. PATENT DOCUMENTS 4,489,106  12/1984  Duffer et al. ............................ 427/154

*Primary Examiner*—D. S. Nakarani
*Attorney, Agent, or Firm*—Kilgannon & Steidl

[57] ABSTRACT

The present invention provides stain-inhibiting protection to glass surfaces of stacked glass sheets utilizing one or more water-soluble organic acid dispersed in a matrix of a water-soluble polymer or mixtures thereof. Suitable water-soluble organic acids may be found in the groups consisting of hydroxy mono, di, tri and tetra carboxylic acids. In the preferred form of the invention, components such as humectants, bactericidal and bacteriostatic agents and surface active (wetting) agents may be included in the composition.

12 Claims, 1 Drawing Sheet

COMPOSITION FOR COATING GLASS SHEETS

This is a divisional of application Ser. No. 08/977,968 filed on Nov. 12, 1997, now U.S. Pat. No. 5,962,565.

This invention relates generally to the art of coating compositions used to separate glass sheets when they are stacked for transportation or storage, and more particularly, to coating compositions containing an organic acid in a polymer matrix for the purpose of preventing or retarding the formation of glass stains due to chemical hydrolysis reactions.

It is well known that water can react with soda-lime-silica glass, very slowly, leaching sodium ions from the glass and forming sodium hydroxide, which raises the pH of the water in contact with the glass surface as follows:

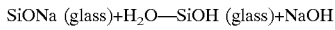

$$SiONa\ (glass) + H_2O \rightarrow SiOH\ (glass) + NaOH$$

If a small volume of water is left in contact with a glass surface for a prolonged period, as can occur in a stack of glass sheets in transit or storage, the pH can become highly alkaline. At pH levels above about 9.0, the hydroxide ions can cause corrosion of the glass surface by destroying silicon-oxygen bonds as follows:

$$SiOSi\ (glass) + OH^- \rightarrow SiOH + OSi^-$$

literally dissolving the glass with the consequence that the glass surface becomes hazy or iridescent. Since transportation and storage conditions cannot always be controlled, it has been common practice for glass manufacturers to use a variety of paper or powder interleaving materials between the surfaces of stacked glass sheets to retard stain damage. Such interleaving materials provide physical separation of the glass sheet surfaces, to minimize mechanical damage, such as abrasion, and also may comprise acid compounds to neutralize the hydroxide formed from alkali ions reacting with water, and retard the pH increase which leads to staining of the glass surface. A common interleaving material comprises polymethylmethacrylate beads for physical separation and adipic acid for neutralizing the hydroxide. One defect of using the powdered interleaving material is the amount of material that must be applied to attain the desired result.

U.S. Pat. No. 4,487,807 to Duffer et al. discloses protecting glass surfaces in a stack of glass sheets by treating the surfaces with a mixture of stain-inhibiting organic acids which crystallize on the glass surface, and separating adjacent glass sheets with an interleaving material, preferably in particulate form, such as synthetic polymeric beads or natural porous cellulose materials such as wood flour. In mixed acid compositions wherein a high and low water-soluble organic acids are used, e.g., malic and adipic, a difficulty is often encountered in getting sufficient low water-soluble acid present on the glass surface, or if applied to the surface in sufficient amount, drying of the applied solution becomes a problem, necessitating the use of additional mechanical dryers. Further, in washing the glass surface to remove the mixed acid anti-stain composition, the recycled water reaches a saturation point regarding the low water-soluble acid, and said acid will often separate out from the wash water and redeposit on the glass surface.

U.S. Pat. No. 4,489,106 to Duffer et al discloses a two-step method for protecting glass surfaces in a stack of glass sheets by first treating the glass surfaces with a solution of stain-inhibiting organic hydroxy acid and drying the surface prior to dispersing a finely divided particulate interleaving material on the glass surface.

U.S. Pat. No. 4,529,648 to Duffer et al. discloses a method for applying a powdered interleaving material to a glass surface in the form of an aqueous slurry. The powdered interleaving material is preferably a porous cellulose material, such as wood flour or rice flour, which may also comprise a stain-inhibiting acid material such as boric acid, citric acid or tartaric acid.

U.S. Pat. Nos. 4,530,889 and 4,568,605 to Duffer et al. disclose methods and compositions to reduce the staining of stacked glass sheets utilizing porous particulate interleaving materials treated with strong organic acids, such as organo-tin halides and hydroxy carboxylic acids, respectively.

Additionally, there is U.S. Pat. No. 5,641,576 which provides an anti-staining composition which utilizes an organic acid in buffered form as the stain-inhibiting agent.

The above compositions for anti-staining glass surfaces have limitations that have resulted in continuous research to find a more suitable composition for anti-staining of glass sheets. For example, in compositions where dry polymer beads were used with an organic dibasic acid, adipic acid, for example, the coating was not continuous and to some degree not contiguous with the glass surface, with the consequence that under severe conditions, staining would occur. Also the limited solubility of the dibasic acid, precluded having a sufficient quantity of acid present on the glass surface to counteract the ongoing formation of base through the hydrolysis reaction referred to above.

The mixed acid compositions of the prior art caused non-uniform crystallization of the several acids on the glass surface.

Clearly, the glass industry prefers single acid compositions for reason of ease of removal, etc. However, the single acid, high water-solubility compositions of the prior art have the disadvantage, particularly where there is considerable condensation of ambient water, in water run off and removal of the acid from the glass surface. Without the protective acid present on the glass surface, alkali build-up will continue in areas of the glass where the acid has vacated with the consequence of ultimately forming "second degree dissolution" or staining of the glass.

SUMMARY OF THE INVENTION

The present invention provides stain-inhibiting protection to glass surfaces of stacked glass sheets utilizing one or more water-soluble organic acid dispersed in a matrix of a water-soluble polymer or mixtures thereof. Suitable water-soluble organic acids may be found in the groups consisting of hydroxy mono, di, tri and tetra carboxylic acids. In the preferred form of the invention, components such as humectants, bactericidal and bacteriostatic agents and surface active (wetting) agents may be included in the composition.

FIG. 1 is a block diagram of the Grafotec LA 1000 Liquid Applicator referred to in this specification.

DESCRIPTION OF THE DETAILS OF THE INVENTION

Suitable organic water-soluble dicarboxylic acids found useful in the subject invention include malic, citric, fumaric and hydroxysuccinnic acids. The organic water-soluble acids of this invention must have a minimum water-solubility of fifty (50%) percent by weight. Combinations of water-soluble organic acids may be used in the composition of this invention. Also, the selected organic acid should be stable against further reaction with the other components under acidic conditions. The pH of the aqueous solutions of this invention may be from 1.5 to 5.0. Solutions of the subject invention above pH5 should be avoided. Suitable water-soluble polymers for use in the compositions of this invention comprise polyvinyl alcohol, polyvinyl pyrrolidone or polyethylene oxide and mixtures thereof. A further requirement of the water-soluble polymers of the subject invention is that the water-soluble polymer(s) do not form transesterification products with the water-soluble organic acids under the conditions encountered during stacking, storing and washing of the glass to remove the anti-stain composition. Generally, a water-soluble polymer that does not substantially increase the viscosity of the organic acid/polymer solution is satisfactory. Preferably, an aqueous solution of the organic acid/water soluble polymer of this invention will have a viscosity no greater than 25 CPS. Polyethylene oxide (PEO) is the preferred water-soluble polymer; the most preferred of the PEO polymers having a statistical molecular weight of 8,000 but ranging from a statistical molecular weight of 2,000 to 20,000.

It has been found that the relative ratio of the water-soluble organic dicarboxylic acid to the water-soluble polymer may vary between 75 acid to 25 polymer to 25 acid to 75 polymer. Preferably, the acid/polymer used will form a film on the glass sheet that is continuous and that has good contiguity with the glass. However, the compositions of this invention will have satisfactory anti-stain properties even though the acid/polymer composition does not form a continuous film so long as the composition has good contiguity with the glass surfaces to be treated and the discontinuity, if any, in the composition is in the form of micro droplets that are either overlapping or in close proximity. The preferred ratio of the water-soluble organic acid to the water-soluble polymer is about seven to three (7 to 3). Applying a film of the compositions of this invention which provides about 5 mg/square foot to 25 mg/square foot of glass surface of the water-soluble organic acid has been found to be satisfactory to preclude formation of stains due to the secondary hydrolysis reaction. Regarding thickness of film or coating, a thickness of 450 Angstroms to 3000 Angstroms has been found adequate to restrain stain formation due to the secondary hydrolysis reaction.

As noted above, in the preferred form of the invention, a humectant is added. The humectant prevents cross-linking of the polymer, maintains clarity of the coating and facilitates removal of the coating from the glass before the glass is converted. It has been found that $ZnCl_2$ is a suitable humectant when added to the composition at a concentration of 0.01–1.0 percent by weight. Calcium chloride is a further suitable humectant.

It has been found that incorporating antifungal agents, algaecides and bacteriastats are useful in preventing growth of flora and fauna in the aqueous solutions of this invention on the treated glass surfaces. The amount of said biological inhibitor present in the composition may vary from 5 PPM to one (1%) percent by weight of the solution. The preferred inhibitor is one that need be present in the smallest amount by weight and is compatible with the other components. Diiodomethyl-p-tolylsulfone (sold under the trademark Amical 48 by Angus Chemical Co.) and 3-iodo-2-propynylbutyl carbonate (sold under the trademark OMACIDE by Olin Chemical Co.) has been found to function satisfactorily.

Finally, it has been found that the presence of a surface active agent in the anti-staining composition is desirable. The preferred class of surface active agents are non-ionic and characterized as low-foaming, the preferred material being polyoxyethylene polyoxypropylene glycol, a copolymer with a molecular weight of approximately 2000.

With the presence of the surface active agent, there is a control over the drop size as it is delivered from the applicator equipment to the glass surface.

It has been found that surfactant present in an amount of 0.001% by weight and not in excess of 1.0% by weight provides a satisfactory result, most preferably the amount of surfactant is 0.01% to 0.5%.

The amount of surfactant present in the composition preferably reduces the surface tension of the anti-staining composition. Reducing the surface tension to about 40 dynes per centimeter provides a satisfactory result in the sense of adequately wetting the glass surface.

The anti-staining composition is a clear liquid at room temperature and may be applied to the glass surface to be treated by any of many known techniques such as, for example, pressure spray system and high speed roller systems.

The preferred equipment for application of the compositions of this invention to a glass surface is the Grafotec LA 1000 Liquid Applicator manufactured and sold by Grafotec Kotterer GmbH having a place of business at Gewerbestrasse 8, Diedorf, D-88420, Germany. The LA 1000 applicator is a mechanical liquid flooding or pooling system capable of applying liquids containing soluble substances. The liquid is drawn in by a high-speed rotor and expelled by the centrifugal force generated.

Depending on the speed of the rotor, this results in either a rain of coarse droplets or a finely dispersed mist. The latter creates even wetting of the materials.

By means of an electrically-controlled shutter (screening flap), the slit through which the spray of liquid is emitted by the machine can be modified. This means that a remote control system can be used to regulate the amount of liquid applied (e.g. when the speed of the endless glass strip through the system is altered). Edge sensors provide continuous monitoring of the position of the edge of the glass. Deflectors (edge limiters) fitted to the LA 1000 determine the application width. Motors controlled by the sensors move these deflectors towards the edge of the web to ensure that the application width and the specified gap to the edge are always maintained.

If the glass should break, (break over the whole width), a sensor switches the liquid applicator off completely. This means specifically: the deflectors stop moving, the shutters close immediately, the rotor motor is switched off, the pump is switched off.

A tandem pump system provides the liquid applicator with a consistent supply of liquid for application. The pumps are automatically activated alternately, according to a specified system. This means that a functioning pump is always available as an operational spare.

A flushing program allows the liquid applicator to be flushed out with clean water to clear away any solid deposits (e.g., salt deposits).

It has been found that applying a coating at a concentration level of from 5 mg acid/square foot to 75 mg acid/square foot and preferably between 10 mg acid/square foot to 25 mg acid/square foot will yield a satisfactory tack free continuous and contiguous coating on the glass sheet that has improved anti-staining characteristics over prior art organic acid compositions.

Table I sets forth deposition rates of the preferred composition of this invention with the Grafotec Sprayer.

TABLE I

| Slot Opening at 5000 RPM | Milligrams, Square Foot |
| --- | --- |
| 3 | 7.15 |
| 5 | 6.92 |
| 14 | 15.45 |
| 35 | 36.80 |

Table II set forth below shows test results comparing the composition of this invention with prior art compositions.

The results reported in Table II reflect samples of glass that have been placed in a heated humidity chamber maintained at a temperature of 145° F. and a relative humidity of 95%. The conditions in the humidity chamber are comparable to a warehouse storage of approximately 1.5 to 2 years at the average temperature and humidity for the northeastern states of the United States.

In Table II, APC-M(1) is a composition having the following composition:

| Component | Parts By Weight |
| --- | --- |
| Polyethylene oxide (M.W. 8000) | 26.5 |
| Malic acid | 63.0 |
| ZnCl$_2$ | 0.405 |
| Diodomethyl-p-tolylsulfone | 0.045 |
| Polyoxyethylene/Polyoxypropylene Copolymer (M.W. 2000) Water | 10.0 |

APC-M is the preferred composition of this invention as set forth above. Aquahex Clear is a product using polyvinyl alcohol as the polymer and malic acid (50% by weight) as the organic acid, as well as a biocide and a surfactant. PMMA/Acid is a powdered interleviant having polymethylmethacrylate as the polymer and adipic acid as the organic acid. The BLANK in Table II is untreated glass. The number value reported in Table II is the percent of the total surface area of the glass that is stained. The letters L, M and H represent the density of pitting of the glass measured visually.

TABLE II

HUMIDITY CABINET STAINING TEST RESULTS EXPOSURE (%)

| MATERIAL | CONCENTR. | 7 DAYS | 10 DAYS | 14 DAYS | 17 DAYS | 21 DAYS | 60 DAYS |
| --- | --- | --- | --- | --- | --- | --- | --- |
| APC-M(1) | 10 MG/SQ FT | 1M | 10 L | 10 L | 30M | 30M | 50M |
| APC-M(2) | 15 MG/SQ FT | 0 | 1 L | 5M | 5M | 10M | |
| AQUAHEX CLEAR | 10 MG/SQ FT | 30 H | 30 H | 100 H | 100M | 95 H | |
| PMMA/ACID | 40 MG/SQ FT MINIMUM | 0 | 5M | 5M | 20M | | |
| BLANK | | 0 | 80 H | 100 H | 100M | | |
| | | 0 | 70 H | 100 H | 100 H | | |

The preferred composition of this invention is:

| Component | Parts By Weight |
| --- | --- |
| Polyethylene oxide (M.W. 8000) | 30 |
| Malic acid | 70 |
| ZnCl$_2$ | 0.5 |
| Diodomethyl-p-tolylsulfone | 0.05 |
| Polyoxyethylene/Polyoxypropylene Copolymer (M.W. 2000) Water | 10.0 |

Glass sheets may be stacked for transportation and/or storage in a variety of pack, box, pallet or rack configurations. A preferred shipping rack is described in U.S. Pat. No. 5,379,904, the disclosure of which is incorporated herein by reference.

Although specific examples of the invention have been shown for purposes of disclosure, it is to be understood that various modifications can be made therefrom without departing from the spirit and scope of the invention.

I claim:

1. An article comprising:
a glass sheet having opposed major surfaces; at least one of said surfaces having disposed thereon a water-soluble organic acid dispersed in a matrix of a water-soluble polymer, said polymer forming a coating on the glass surface and further wherein the water-soluble organic acid and the water-soluble polymer are non-reactive and the pH of a water solution of the aforesaid acid and polymer is not in excess of 5.

2. The article of claim 1, wherein the water-soluble organic acid is selected from the group consisting of hydroxy monocarboxylic acids, hydroxy dicarboxylic acids, hydroxy tricarboxylic acids and hydroxy tetracarboxylic acids.

3. The article of claim 1, wherein the water-soluble organic acid is a hydroxy dicarboxylic acid.

4. The article of claim 1, wherein the water-soluble organic acid is malic acid.

5. The article of claim 1, wherein the water-soluble polymer is selected from the group consisting of polyvinyl alcohol, polyvinyl pyrrolidone, and polyethylene oxide.

6. The article of claim 1, wherein the water-soluble polymer is polyethylene oxide.

7. The article of claim 1, wherein the matrix further includes a humectant.

8. The article of claim 1, wherein the matrix further includes a bactericidal or bacteriostatic agent.

9. The article of claim 1, wherein the matrix further includes a surface active agent.

10. The article of claim 7, wherein the matrix further includes a bactericidal or bacteriostatic agent.

11. The article of claim 10, wherein the matrix further includes a surface active agent.

12. The article of claim 11 wherein the water-soluble acid is malic acid, the water-soluble polymer is polyethylene oxide, the humectant is zinc chloride, the bactericidal or bacteriostatic agent is selected from the group consisting of diiodomethyl-p-tolylsulfone and 3-iodo-2-propynylbutyl carbonate and the surfactant is polyoxyethylene polyoxypropylene glycol, a copolymer with a molecular weight of approximately 2000.

* * * * *

UNITED STATES PATENT AND TRADEMARK OFFICE
CERTIFICATE OF CORRECTION

PATENT NO.   : 6,139,970
DATED        : October 31, 2000
INVENTOR(S)  : Carmine Pagano It is certified that error appears in the above-identified patent and that said Letters Patent is hereby corrected as shown below:

<u>Title page,</u>
Item [62], Related U.S. Application Data, should read as follows:
-- [62] Division of application No. 08/977,968, Nov. 25, 1997, Pat. No. 5,962,565. --

Signed and Sealed this

Twenty-sixth Day of November, 2002

Attest:

Attesting Officer

JAMES E. ROGAN
*Director of the United States Patent and Trademark Office*